US012700326B2

(12) United States Patent
Oh et al.

(10) Patent No.: US 12,700,326 B2
(45) Date of Patent: Aug. 4, 2026

(54) UNLOADING ARM MANIPULATION TRAINING DEVICE

(71) Applicant: KOREA GAS CORPORATION, Daegu (KR)

(72) Inventors: Chang Seok Oh, Seoul (KR); Young Jae Lee, Suwon-si (KR); Se Ryung Park, Daegu (KR); Ki Tae Jung, Daegu (KR)

(73) Assignee: KOREA GAS CORPORATION, Daegu (KR)

( * ) Notice: Subject to any disclaimer, the term of this patent is extended or adjusted under 35 U.S.C. 154(b) by 191 days.

(21) Appl. No.: 18/723,466

(22) PCT Filed: Dec. 29, 2021

(86) PCT No.: PCT/KR2021/020117
§ 371 (c)(1),
(2) Date: Jul. 18, 2024

(87) PCT Pub. No.: WO2023/127994
PCT Pub. Date: Jul. 6, 2023

(65) Prior Publication Data
US 2025/0061813 A1      Feb. 20, 2025

(51) Int. Cl.
| | |
|---|---|
| *G09B 5/02* | (2006.01) |
| *H04N 9/31* | (2006.01) |
| *H04N 13/363* | (2018.01) |
| *H04N 13/366* | (2018.01) |

(52) U.S. Cl.
CPC ............. *G09B 5/02* (2013.01); *H04N 9/3147* (2013.01); *H04N 13/363* (2018.05); *H04N 13/366* (2018.05); *H04N 2213/008* (2013.01)

(58) Field of Classification Search
CPC .......... G09B 5/00; G09B 5/02; H04N 9/3147; H04N 13/363; H04N 13/366; H04N 2213/008
See application file for complete search history.

(56) References Cited

U.S. PATENT DOCUMENTS

| | | | | |
|---|---|---|---|---|
| 3,741,638 A | * | 6/1973 | Geary ...................... | G09B 9/05 434/69 |
| 5,857,917 A | * | 1/1999 | Francis .................... | G09B 9/14 472/60 |

(Continued)

FOREIGN PATENT DOCUMENTS

| | | |
|---|---|---|
| JP | 06-250583 | 9/1994 |
| JP | 08-185113 | 7/1996 |

(Continued)

*Primary Examiner* — Timothy A Musselman
(74) *Attorney, Agent, or Firm* — PnK IP LLC

(57) ABSTRACT

An unloading arm manipulation training device is provided. The device includes: a frame having a training space inwardly; at least one screen which is provided in the frame and onto which an unloading arm training image is projected; and at least one image output unit that outputs the unloading arm training image toward the screen, wherein the at least one image output unit is provided outside the frame to output the unloading arm training image toward an outer surface of the at least one screen, thereby preventing a trainee located in the frame from being projected on the at least one screen.

8 Claims, 5 Drawing Sheets

(56)  References Cited

U.S. PATENT DOCUMENTS

| | | | |
|---|---|---|---|
| 2008/0206720 A1* | 8/2008 | Nelson | G09B 9/165 |
| | | | 434/44 |
| 2013/0302759 A1* | 11/2013 | Welles | G09B 9/05 |
| | | | 434/69 |
| 2016/0104391 A1* | 4/2016 | Wieland | G09B 19/24 |
| | | | 434/219 |
| 2021/0192969 A1* | 6/2021 | de Oliveira Alves, Jr. | |
| | | | G09B 9/326 |

FOREIGN PATENT DOCUMENTS

| | | |
|---|---|---|
| KR | 10-2010-0034692 | 4/2010 |
| KR | 10-2015-0015193 | 2/2015 |
| KR | 10-2016-0025929 | 3/2016 |

* cited by examiner

UNLOADING ARM MANIPULATION TRAINING DEVICE

CROSS REFERENCE TO RELATED APPLICATION

This application is a National Stage Application of International Application No. PCT/KR2021/020117, filed on Dec. 29, 2021, which is incorporated by reference for all purposes as if fully set forth herein.

BACKGROUND

Field

Embodiments of the invention relate to an unloading arm manipulation training device.

Discussion of the Background

In general, liquefied natural gas (LNG) is transported by LNG vessels and transferred to LNG storage tanks on land through unloading arms, offshore pipelines, and the like. In this case, a manipulator manipulating an unloading arm requires a precise manipulation to connect the unloading arm to an LNG/natural gas (NG) connection pipe located on an LNG vessel, and when the manipulation is incorrect, damage to materials or people may occur due to collision between the unloading arm and the LNG vessel.

Accordingly, skilled manipulators are required to perform an unloading arm manipulation, but there is a problem that it is difficult for manipulators to perform unloading arm manipulation practice because entry and exit times of the LNG vessel are flexible and the number of unloading arms is limited. In particular, unexpected emergency situations may occur when the unloading arms are manipulated, and there is a problem that accidents occur because the manipulators who are not trained for these situations could not perform suitable manipulations.

The above information disclosed in this Background section is only for understanding of the background of the inventive concepts, and, therefore, it may contain information that does not constitute prior art.

SUMMARY

The present invention is directed to providing an unloading arm manipulation training device for solving the above-described problems.

Objectives of the present invention are not limited to the above-described objectives, and objectives that are not described above will be clearly understood by those skilled in the art from the following descriptions.

One aspect of the present invention provides an unloading arm manipulation training device. The device includes a frame which forms a training space therein, one or more screens which are provided on the frame and onto which an unloading arm training video is projected, and one or more image output units which output the unloading arm training video onto the screens, wherein the image output units is provided outside the frame and output the unloading arm training video onto outer surfaces of the screens to prevent a trainee positioned inside the frame from being projected onto the screens.

In addition, each of the image output units may include a projector which projects the unloading arm training video upward or downward and a reflection unit which is provided above or below the projector and reflects the unloading arm training video projected by the projector onto the screen.

In addition, the projector is provided as a plurality of projectors which projects unloading arm training videos of different viewpoints to provide a three-dimensional video to the trainee wearing polarized glasses.

In addition, each of the screens may be formed of a translucent material such that the unloading arm training video projected onto the outer surface of the screen is projected inside the frame.

In addition, the device may further include a trainee manipulation unit which receives one or more manipulation inputs for unloading arm manipulation by the trainee and a control unit which updates the unloading arm training video output by the image output units according to the manipulation inputs.

In addition, the trainee manipulation unit may include a movable manipulation unit used inside the frame by the trainee and a fixed manipulation unit used outside the frame by the trainee, wherein only some of the manipulation inputs by the fixed manipulation unit may be input to the movable manipulation unit.

In addition, when the fixed manipulation unit transmits the manipulation inputs to the control unit, the control unit may update the unloading arm training video of which a viewpoint is fixed, and when the movable manipulation unit transmits the manipulation inputs to the control unit, the control unit may update the unloading arm training video of which a viewpoint is changed due to a position of the trainee.

In addition, the device may further include a detection sensor which detects a change in position of the trainee inside the frame, wherein the control unit updates the unloading arm training video on the basis of the change in position received from the detection sensor. In addition, the device may further include a manipulation unit for administrator which transmits an administration input related to at least one of a plurality of pieces of emergency situation information including a change in surrounding environment, power loss, component failure, and line disconnection between quick release hooks (QRH) and a vessel to the control unit, wherein the control unit may update the unloading arm training video according to the administration input.

In addition, at least some of the manipulation inputs by the trainee manipulation unit may be restricted by the control unit according to the administration input.

According to the present invention, a trainee can repeatedly perform unloading arm manipulation training using a trainee manipulation unit.

In addition, according to the present invention, trainee's ability to react to an emergency situation can be strengthened and damage to equipment due to incorrect manipulation can be prevented during an actual manipulation using a manipulation unit for administrator.

In addition, according to the present invention, an image output unit can output an unloading arm training video onto an outer surface of a screen, thereby preventing the trainee positioned inside a frame from being projected onto the screen.

In addition, according to the present invention, a plurality of projectors can project different unloading arm training videos onto each screen to provide an unloading arm training site with higher three-dimensional effects and improved sensation of realism to the trainee.

In addition, according to the present invention, even when a distance from the screen to the image output unit is not long, an unloading arm training video is output onto the screen to be enlarged by changing a projection path and the distance of the unloading arm training video emitted from the projector using a reflection unit, thereby improving spatial efficiency.

In addition, according to the present invention, an unloading arm training video can be updated according to changes in position and viewing angle of the trainee received by a detection sensor, thereby providing sensation of reality to the trainee.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION

Figure 1:
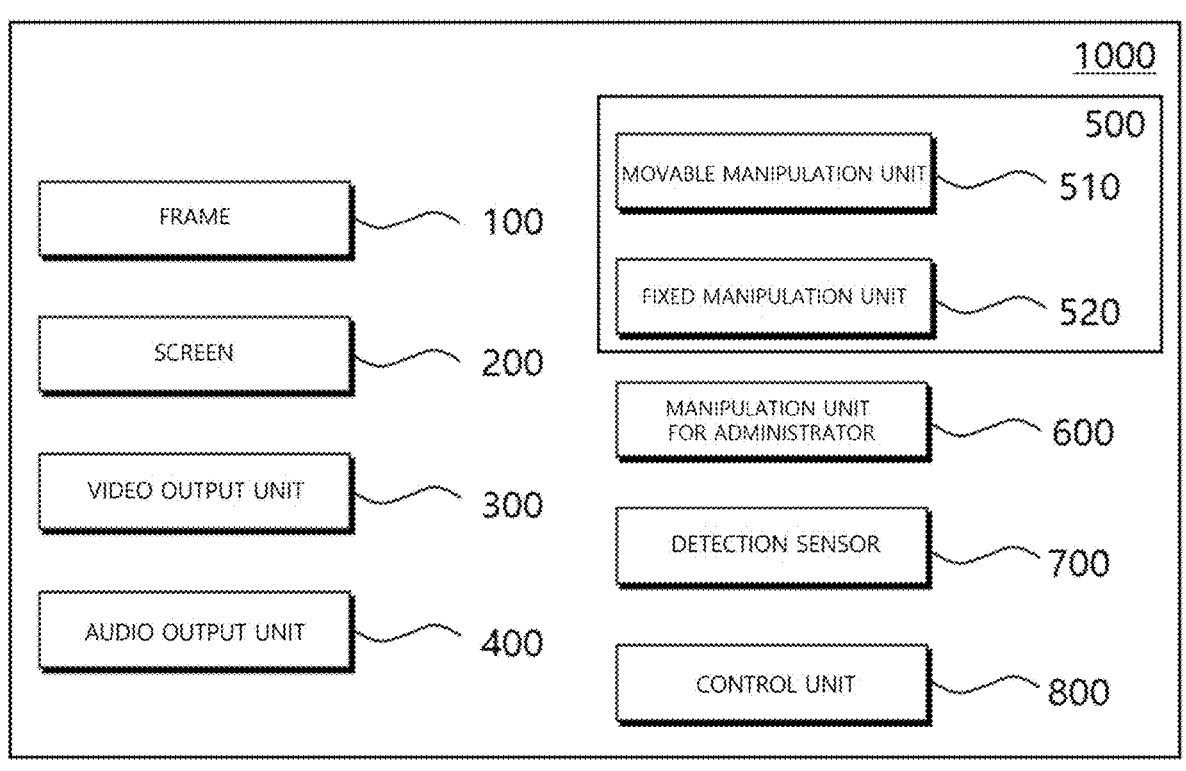
FIG. 1 is a block diagram illustrating an unloading arm manipulation training device according to one embodiment of the present invention.

Hereinafter, exemplary embodiments according to the present invention will be described in detail with reference to the contents illustrated in the accompanying drawings. In addition, methods of configuring and using apparatuses according to the embodiments of the present invention will be described in detail. The same reference numerals or symbols in the drawings refer to parts or components which substantially perform the same function. Upward, downward, left, and right directions, which will be described below, are based on the drawings for the sake of convenience, and the scope of the present invention is not necessarily limited thereto.

Although the terms "first," "second," and the like may be used herein to describe various components, these components should not be limited by these terms. These terms are only used for distinguishing one component from another. For example, a first component may be named a second component, and a second component may similarly be named a first component without departing from the scope of the present invention. The term "and/or" includes any one or any possible combination of a plurality of associated listed items.

In addition, terms used in the present specification are merely used to describe the exemplary embodiments and are not intended to limit and/or restrict the embodiments. An expression used in the singular encompasses an expression of the plural unless it has a clearly different meaning in context. In the present specification, it should be understood that terms such as "including," "having," and "comprising" are intended to indicate the presence of the features, numbers, steps, manipulations, components, parts, or combinations thereof described in the specification, and are not intended to preclude the possibility which one or more other features, numbers, steps, manipulations, components, parts, or combinations thereof may be present or added.

Throughout this specification, when a first portion is referred to as being "connected" to a second portion, it includes being "directly connected" to the second portion and "indirectly connected" to the second portion with a third portion disposed therebetween. In addition, when a certain portion "includes" a certain component, this does not exclude other components unless explicitly described otherwise, and other components may be further included.

In addition, the terms "unit" and "module" described in the specification refer to units of processing at least one function or manipulation and may be implemented by hardware or software or a combination thereof.

FIG. 1 is a block diagram illustrating an unloading arm manipulation training device according to one embodiment of the present invention.

Referring to FIG. 1, an unloading arm manipulation training device 1000 may include a frame 100, a screen 200, an image output unit 300, an audio output unit 400, a trainee manipulation unit 500, a manipulation unit for administrator 600, a detection sensor 700, and a control unit 800.

A training space may be formed inside the frame 100 such that a trainee performs unloading arm manipulation training.

The screen 200 may be provided on at least one surface of the frame 100, and an unloading arm training video may be projected onto the screen 200. The trainee may perform training such as connecting or separating an unloading arm to or from a liquefied natural gas (LNG) vessel using the unloading arm training video projected onto the screen 200. One of various type screens, such as a manual screen, an electric screen, and a fixed screen, may be used as the screen 200, but the screen 200 is not limited thereto, and a display panel formed of a liquid crystal display (LCD), organic light-emitting diodes (OLEDs), or light-emitting diodes (LEDs) may also be used as the screen 200.

The image output unit 300 may output an unloading arm training video onto the screen 200. For example, the unloading arm training video may include an unloading arm including a plurality of outboard arms and inboard arms, an unloading arm driving device, and a control device, an LNG vessel located at sea, an LNG storage tank loaded on the LNG vessel, an LNG storage tank located on land, and the like.

The audio output unit 400 may output at least one piece of audio related to unloading arm training to the trainee. For example, the audio output unit 400 may output sound generated as the unloading arm, the unloading arm driving device, the control device, and the like are driven, or may output sound according to changes in marine environment such as rain, wind, and waves. However, the present invention is not limited thereto.

The trainee manipulation unit 500 may transmit at least one manipulation input for unloading arm manipulation to the control unit 800 by the trainee. The manipulation input may include outboard arm selecting/unfolding, outboard arm selecting/folding, inboard arm selecting/ascending, inboard arm selecting/descending, and the like. In addition, one of various input devices, which may be applied in the corresponding technology, such as a key, a touch panel, and a switch, may be used as the trainee manipulation unit 500.

In the embodiment, the trainee manipulation unit 500 is to transmit a manipulation input for unloading arm manipulation to the control unit 800 by the trainee and may include a movable manipulation unit 510 used inside the frame 100 by the trainee and a fixed manipulation unit 520 outside the frame 100 used by the trainee. In this case, among manipulation inputs by the fixed manipulation unit 520, only some manipulation inputs may be input to the movable manipulation unit 510. For example, the fixed manipulation unit 520 may have functions of switching videos, selecting a menu, selecting an apparatus, manipulating the audio output unit 400, and like in addition to an input function for unloading arm manipulation.

In the embodiment, when a manipulation input is transmitted to the control unit 800 by the movable manipulation unit 510, the control unit 800 may update an unloading arm training video of which a viewpoint is changed according to a position of the trainee. For example, a position sensor may be attached to the movable manipulation unit 510, and an unloading arm training video may be updated on the basis of a change in position of the trainee detected by the position sensor. In addition, when a manipulation input is received from the fixed manipulation unit 520, the control unit 800 may update an unloading arm training video of which a viewpoint is fixed. In this case, a viewpoint which is a reference of the fixation may be a viewpoint at which the trainee is positioned right before the fixed manipulation unit 520 is manipulated. That is, when the trainee transmits a manipulation input to the control unit 800 using the movable manipulation unit 510, the control unit 800 may update an unloading arm training video projected onto the screen 200 according to a change in position of the trainee. In addition, when the trainee transmits a manipulation input to the control unit 800 using the fixed manipulation unit 520, the control unit 800 may update an unloading arm training video viewed from one viewpoint regardless of a change in position of the trainee.

In the embodiment, the fixed manipulation unit 520 may change a mode of unloading arm manipulation training. For example, a training method using the movable manipulation unit 510 and a training method using the fixed manipulation unit 520 may be selected through one of various input devices of the fixed manipulation unit 520. Through this, the trainee may perform the unloading arm manipulation training suitable for the trainee manipulation unit 500, thereby improving efficiency of the unloading arm manipulation training.

The manipulation unit for administrator 600 may transmit an administration input related to at least one of a plurality of pieces of emergency situation information to the control unit 800 by an administrator. For example, an administration input may be generated by the administrator by turning a switch on or off to generate emergency situation information. In this case, the emergency situation information may include a change in surrounding environment (for example, changes in wind direction, wind speed, water level, time, weather, etc.), power loss, component failure, and line disconnection between quick release hooks (QRH) and a vessel. In addition, one of various input devices applicable in the art, such as a key, a touch panel, and a switch, may be used as the manipulation unit for administrator 600.

In the embodiment, the manipulation unit for administrator 600 may have at least one function among trainee training history management, training video management, and evaluation sheet management for quantitative/qualitative evaluation. For example, trainee training history may include training stop or completion information and the like of the trainee for each task or step. In addition, for example, the training video management may include management for video storage, playback, and stopping, etc., and the evaluation sheet management may include management for a trainee's score, score summation, evaluation opinion input, etc. for each task or step.

The control unit 800 may update an unloading arm training video output from the image output unit 300 on the basis of an administration input of the administrator transmitted from the manipulation unit for administrator 600 to the control unit 800. For example, when the manipulation unit for administrator 600 transmits an administration input related to emergency situation information of a line disconnection between the QRH of the unloading arm and the vessel to the control unit 800 by the administrator, the control unit 800 may update an unloading arm training video as a video in which a line of the QRH and the vessel is disconnected. In this case, the trainee may see the updated unloading arm training video and input a manipulation input for reacting to an emergency situation to the trainee manipulation unit 500. Through this, trainee's ability to react to an emergency situation in addition to a given situation can be strengthened, and damage to equipment due to incorrect manipulation can be prevented during an actual manipulation.

In the embodiment, at least some of manipulation inputs by the trainee manipulation unit 500 may be restricted by the control unit 800, particularly, by a control logic preset in the control unit 800, according to administration inputs of the administrator transmitted to the control unit 800 by the manipulation unit for administrator 600. For example, when the manipulation unit for administrator 600 transmits an administration input related to emergency situation information about one failed arm among a plurality of arms of the unloading arm to the control unit 800 by a manipulation of the administrator, a manipulation input related to the failed arm of the trainee manipulation unit 500 may be restricted to be invalid by a control logic preset in the control unit 800. In this case, the trainee may input another manipulation input instead of the limited manipulation input to the trainee manipulation unit 500 to react to the emergency situation.

The detection sensor 700 may detect a change in position and/or viewing angle of the trainee. The control unit 800 may receive a signal according to the change in position from the detection sensor 700 and update an unloading arm training video output from the image output unit 300 on the basis of the change in position. For example, the detection sensor 700 may be provided as a position sensor or camera and attached to polarized glasses, work clothes, shoes, etc. worn by the trainee to detect a change in position including a change in speed, instant movement, etc. However, the detection sensor 700 is not limited thereto, and one of various detection technologies according to the embodiment applied to the present invention may be applied to the detection sensor 700.

In the embodiment, the detection sensor 700 may be provided as a plurality of detection sensors 700 in consideration of a size of the frame 100, position movement of the trainee, a viewing angle of the trainee, a detection angle of the trainee, a distance, a degree of precision, etc. The control unit 800 may update an unloading arm training video output from the image output unit 300 on the basis of the change in position received from the detection sensor 700. For example, when a position of the trainee is moved toward the screen 200 onto which an unloading arm training video is projected, the control unit 800 may update the unloading arm training video such that the size of an image of the unloading arm becomes large. Through this, the trainee may be provided with a sensation of reality as if manipulating the unloading arm at an actual site.

The control unit 800 controls overall manipulations of hardware or software of the unloading arm manipulation training device 1000. For example, the control unit 800 may update an unloading arm training video using the image output unit 300 or the audio output unit 400 according to a manipulation input of the trainee transmitted from the trainee manipulation unit 500 to the control unit 800 or an administration input of the administrator transmitted from the manipulation unit for administrator 600 to the control unit 800 and may overall control the unloading arm manipulation training device 1000.

In the embodiment, the control unit 800 may control actual manipulation or sub-manipulation of not only the unloading arm but also affiliated devices. For example, when a manipulation input, which is not accord with a manipulation condition including a manipulation or sub-manipulation condition (for example, control logic), is transmitted, the control unit 800 may control the unloading arm not to be manipulated. In addition, for example, the control unit 800 includes an emergency shutdown (ESD) function and may control equipment such the unloading arm and the like not to be manipulated by changing the unloading arm and the like into a dangerous state due to incorrect manipulation, failure, or like.

Although not illustrated in FIG. 1, the unloading arm manipulation training device 1000 may further include a communication unit in some embodiments. The communication unit is provided for a direct connection or a connection through a network between an internal device and/or an external device and may be a wired and/or wireless communication unit. Specifically, the communication unit may transmit data from the trainee manipulation unit 500, the manipulation unit for administrator 600, the detection sensor 700, the control unit 800, etc. in a wired or wireless manner, receive data from an external device in a wired or wireless manner, and transmit the data to the control unit 800 or store the data in a memory. For example, the communication unit may include an Ethernet communication unit, a Bluetooth low energy (BLE) communication unit, a near field communication unit, a wireless local area network (WLAN) communication unit, a ZigBee communication unit, an infrared data association (IrDA) communication unit, a Wi-Fi direct (WFD) communication unit, an ultra-wideband (UWB) communication unit, etc., but is not limited thereto. The communication unit may be implemented as at least one module or chip.

In addition, although not illustrated in FIG. 1, the unloading arm manipulation training device 1000 may further include a memory according to the embodiment. The memory may store a program for performing a manipulation of the unloading arm manipulation training device 1000, data according to manipulation performance, etc. For example, the memory may include at least one type of storage medium among a flash memory type, a hard disk type, a multimedia card micro type, a card type memory (for example, secure digital (SD) or extreme digital (XD) memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, etc.

Not all components illustrated in FIG. 1 are essential components of the unloading arm manipulation training device 1000. For example, the unloading arm manipulation training device 1000 may be implemented using more components than the components illustrated in FIG. 1, and the unloading arm manipulation training device 1000 may also be implemented using fewer components than the components illustrated in FIG. 1.

Figure 2:
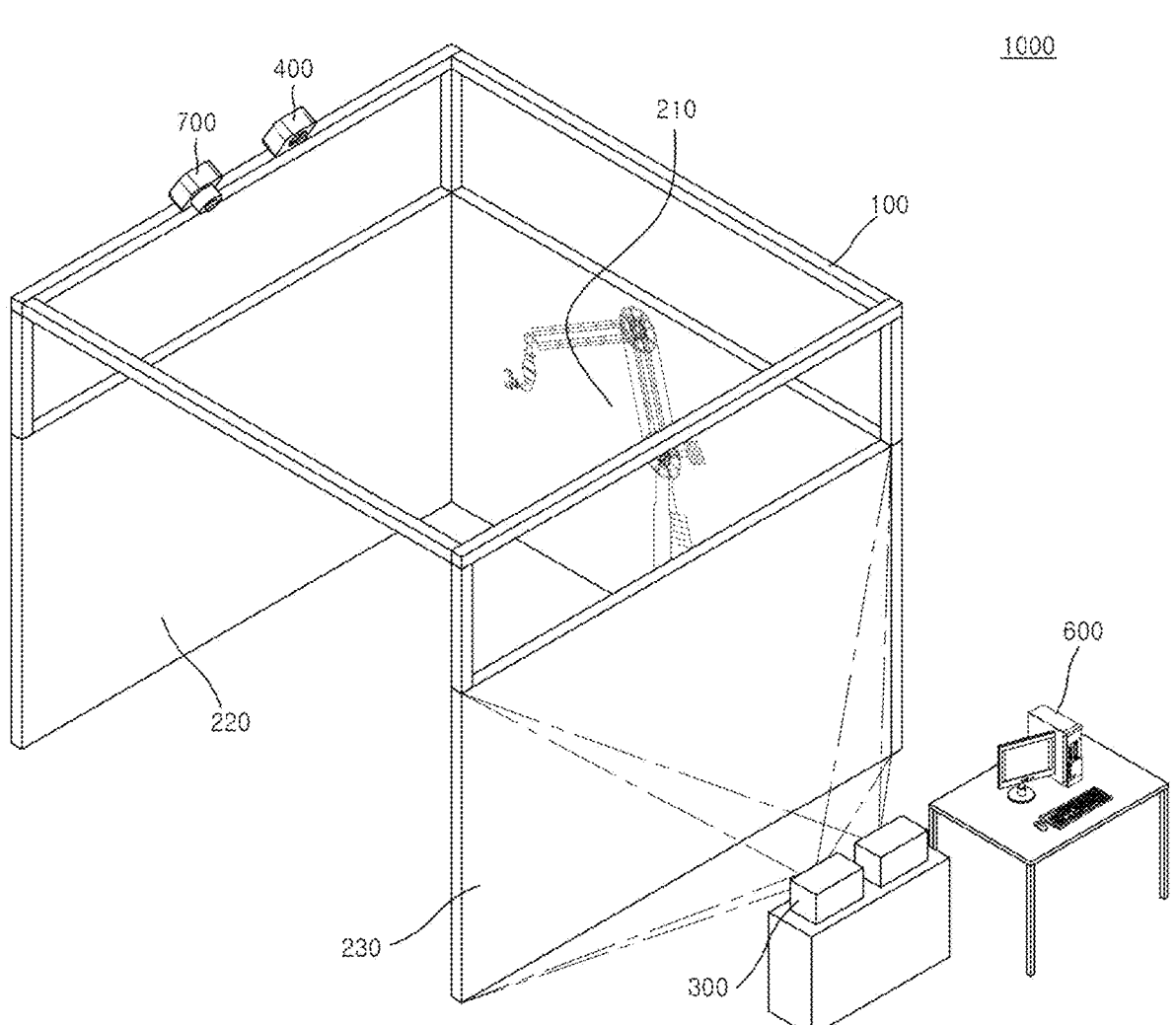
FIG. 2 is a perspective view illustrating the unloading arm manipulation training device according to one embodiment of the present invention.

FIG. 2 is a perspective view illustrating the unloading arm manipulation training device according to one embodiment of the present invention.

Referring to FIG. 2, the frame 100 may be provided with the screen 200 on one surface thereof and a training space formed therein so that the trainee may perform unloading arm manipulation training inside the frame 100. The frame 100 may be formed in a shape such as a hexahedron shape, a rectangular parallelepiped shape, or a " ⊏ " shape, but is not limited thereto.

The screen 200 may be provided at least one surface of the frame 100, and an unloading arm training video may be projected onto the screen 200. In the embodiment, the screen 200 may be formed of a translucent material, and the unloading arm training video projected onto an outer surface of the screen 200 may be projected inside the frame 100. Through this, the trainee may perform the unloading arm manipulation training inside the frame 100. The screen 200 may be formed of any one selected from the group consisting of polyethyleneterephtalate (PET), polyvinyl chloride (PVC), polycarbonate (PC), glass, and acrylic but is not limited thereto, and a translucent material, which allows the unloading arm training video to be projected inside the frame 100, may be used for the screen 200.

In the embodiment, the screen 200 may be provided on only one surface of the frame 100, but is not limited thereto, and may be provided as a plurality of screens 200 provided on three surfaces or six surfaces of the frame 100. For example, a first screen 210 may be provided in front of the trainee positioned inside the frame 100, a second screen 220 may be provided at a left surface, and a third screen 230 may be provided at a right surface.

In FIG. 2, it is illustrated that the unloading arm training video is projected onto only the first screen 210, but the entire unloading arm training video may be divided and projected continuously and three-dimensionally onto the first screen 210, the second screen 220, and the third screen 230 according to the embodiment. That is, since the entire unloading arm training video is divided and projected onto three screens 200, through this, the unloading arm training video may be continuously and three-dimensionally projected onto three surfaces of the frame 100, and the trainee's sensation of immersion and realism in the unloading arm manipulation training can be improved.

In addition, for example, an unloading arm training video may be updated on the first screen 210 and a video though which the trainee may perform unloading arm manipulation training may be projected onto the first screen 210 by the control unit 800 according to a manipulation input of the trainee transmitted from the trainee manipulation unit 500 to the control unit 800. Specifically, for example, a video showing a most suitable manipulation method of manipulating the unloading arm may be projected onto the second screen 220, and the trainee may determine whether a manipulation input of the trainee is proper and check the most suitable manipulation method. In addition, as another example, a control logic flowchart or manipulation guide text may be projected onto the second screen 220 such that whether a manipulation input of the trainee is a valid manipulation input according preset control logic or an incorrect manipulation is determined. However, the present invention is not limited thereto.

In addition, for example, unloading arm manipulation training videos showing different situations may be projected onto the first screen 210, the second screen 220, and the third screen 230. For example, the control unit 800 may update an unloading arm manipulation training video on the screen toward which the trainee's eyes are directed according to a manipulation input of the trainee on the basis of a change in viewing angle of the trainee transmitted from the detection sensor 700 to the control unit 800. In addition, as another example, unloading arm manipulation training videos may be projected onto the second screen 220 and the third screen 230 according to viewing angles of third parties (for example, training observers), not only the trainee may perform unloading arm manipulation training but the training observers may also perform unloading arm manipulation training indirectly. However, the present invention is not limited thereto.

At least one image output unit 300 may be provided to correspond to the screen 200 and may output an unloading arm training video onto the screen 200. In the embodiment, the image output unit 300 may be provided outside the frame 100 and may output the unloading arm training video onto the outer surface of the screen 200. Through this, the trainee positioned inside the frame 100 may be prevented from being projected onto the screen, and even when a training place inside the frame 100 is bright, the trainee may clearly see the unloading arm training video.

In the embodiment, when the screen 200 is provided as the plurality of screens 200, the image output unit 300 may also be provided as a plurality of image output units 300 to correspond to the screens 200. In this case, the image output units 300 may project different unloading arm training videos to correspond to the screens 200.

The unloading arm manipulation training device 1000 illustrated in FIG. 2 is exemplary, and one of various configurations may be applied to the unloading arm manipulation training device 1000 according to an embodiment applied to the present invention.

Figure 3:
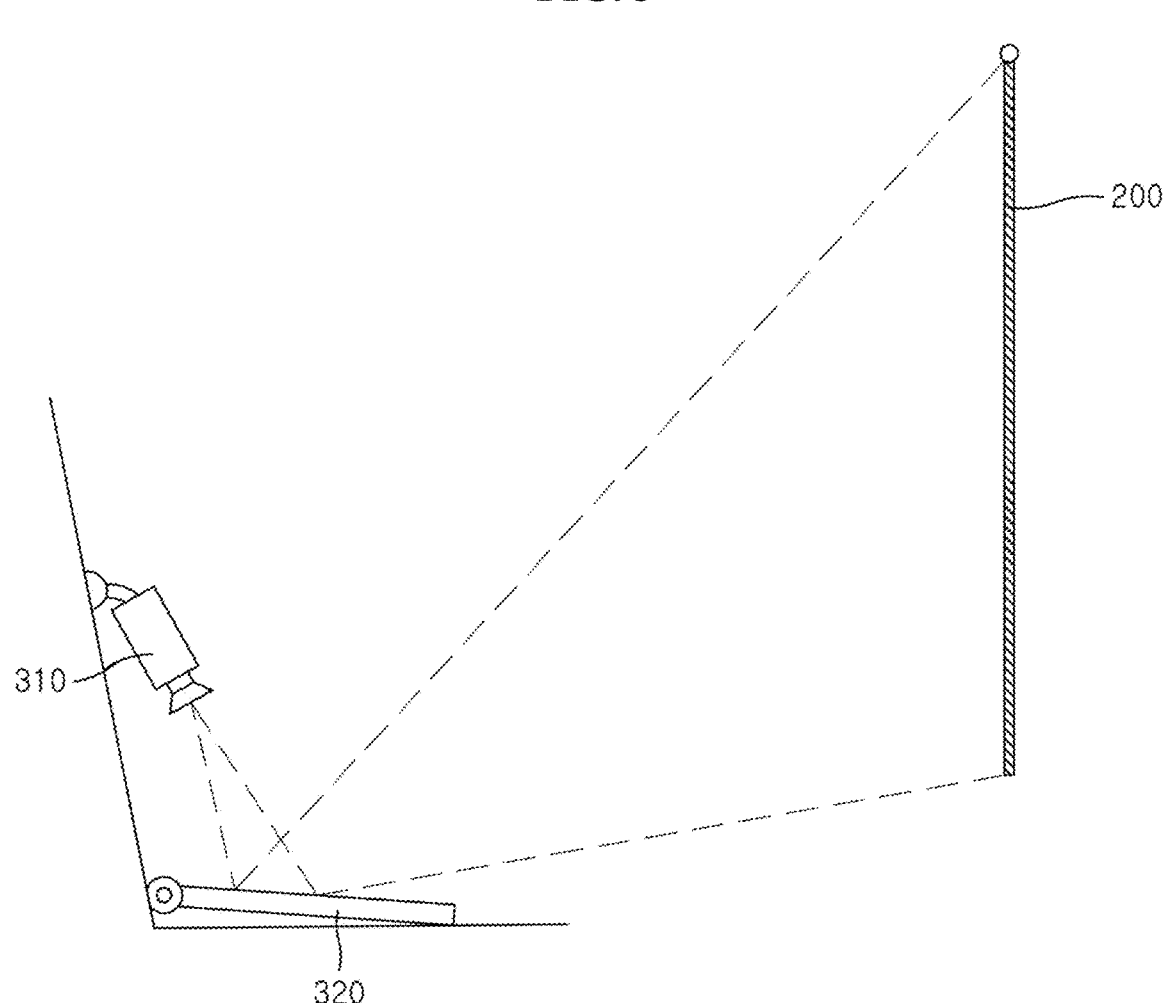
FIG. 3 is a view for describing an image output unit according to one embodiment of the present invention.

FIG. 3 is a view for describing the image output unit according to one embodiment of the present invention.

Referring to FIG. 3, the image output unit 300 may include a projector 310 which projects an unloading arm training video upward or downward. In the embodiment, the projector 310 may be provided as a plurality of projectors 310, and the projectors 310 may project unloading arm training videos of different viewpoints. Through this, a three-dimensional video may be provided to the trainee wearing polarized glasses so that an unloading arm training site with higher three-dimensional effect and an improved sensation of realism may be provided to the trainee.

The image output unit 300 may include a reflection unit 320 disposed above or below the projector 310. The reflection unit 320 may reflect an unloading arm training video projected onto the screen 200 by the projector 310. Even when a distance from the screen 200 to the image output unit 300 is not long, the unloading arm training video may be output to the screen 200 to be enlarged by changing a projection path of the unloading arm training video, thereby also improving spatial efficiency.

The image output unit 300 illustrated in FIG. 3 is an exemplary, and one of various configurations may be applied according to an embodiment applied to the present invention.

Figure 4A:
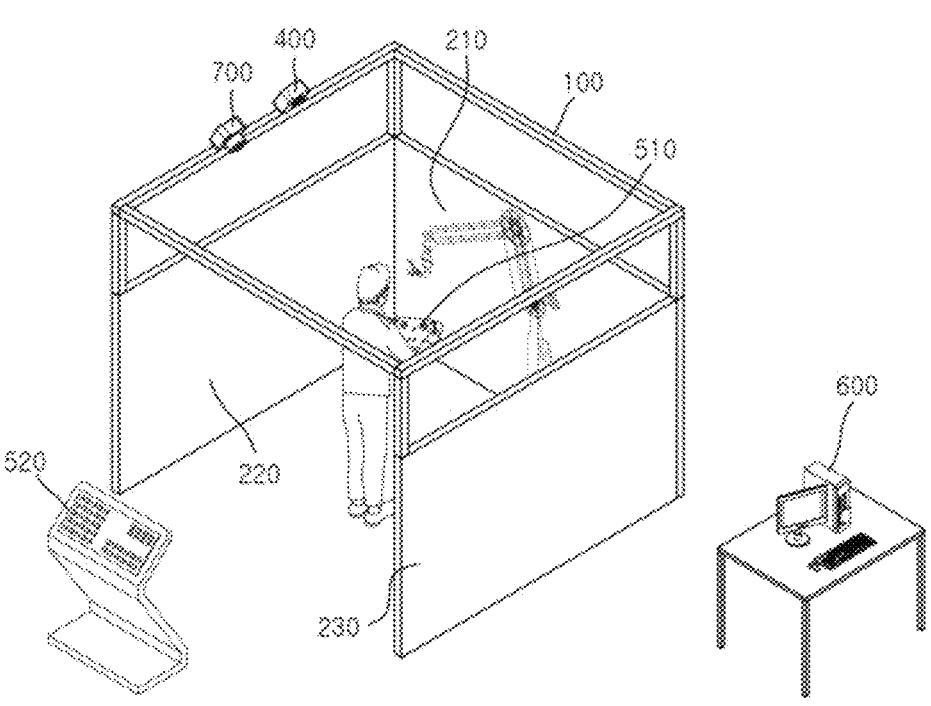
FIGS. 4A and 4B show usage examples of the unloading arm manipulation training device according to one embodiment of the present invention.
Figure 4B:
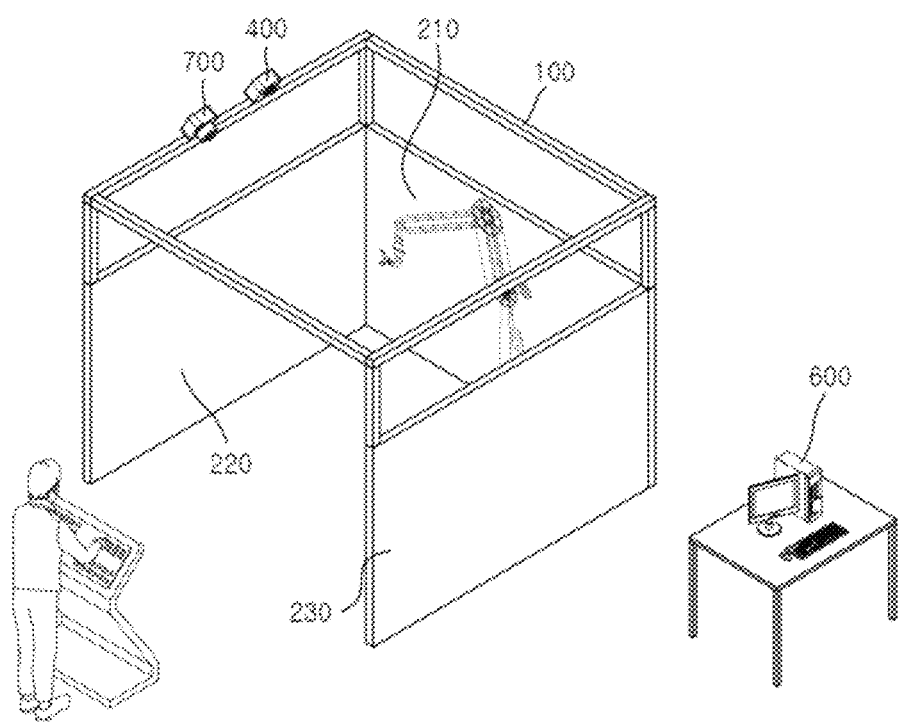

FIGS. 4A and 4B show usage examples of the unloading arm manipulation training device according to one embodiment of the present invention.

FIG. 4A shows a usage example when the movable manipulation unit 510 transmits a manipulation input to the control unit 800 by the trainee. When the manipulation input of the trainee is transmitted to the control unit 800 by the movable manipulation unit 510, the control unit 800 may update an unloading arm training video projected by the image output unit 300 such that a viewpoint is changed due to a position of the trainee. In this case, the detection sensor 700 provided at one side of the frame 100 may detect a change in position of the trainee, and the control unit 800 may update the unloading arm training video on the basis of the change in position.

In addition, FIG. 4B shows a usage example when the fixed manipulation unit 520 transmits a manipulation input to the control unit 800 by the trainee. When the manipulation input is transmitted to the control unit 800 by the fixed manipulation unit 520, the control unit 800 may update an unloading arm training video of which a viewpoint is fixed. In this case, a viewpoint which is a reference of fixation may be a viewpoint of the trainee when the trainee is ultimately positioned just before manipulating the fixed manipulation unit 520.

In this case, the fixed manipulation unit 520 may allow a training method through the movable manipulation unit 510 or a training method through the fixed manipulation unit 520 to be selected by changing a mode of unloading arm manipulation training. Through this, the trainee may perform unloading arm manipulation training suitable for the trainee manipulation unit 500 being used, thereby more improving efficiency of unloading arm manipulation training.

Figure 5A:
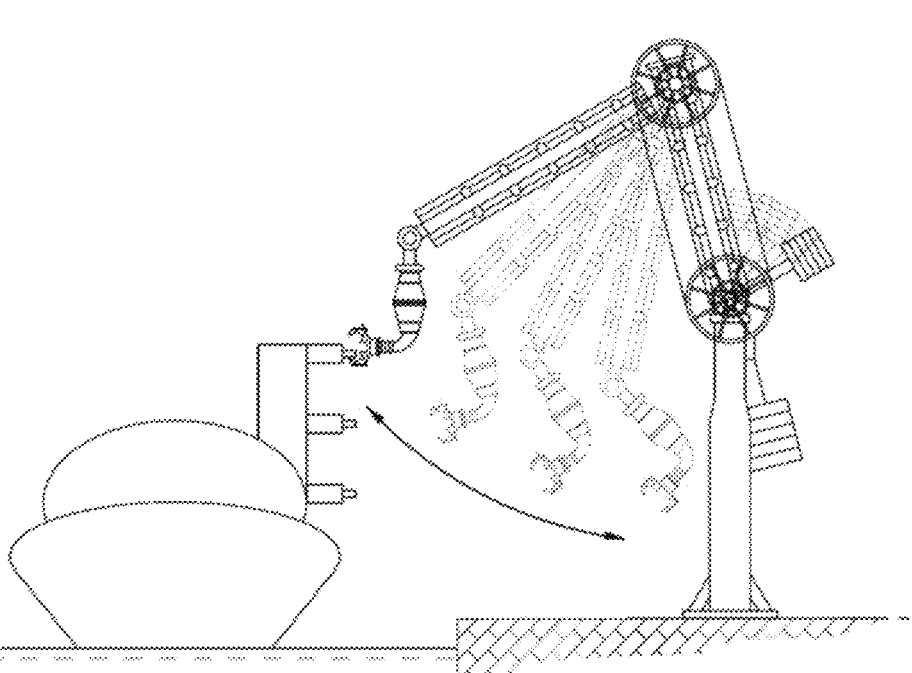
FIGS. 5A and 5B show usage examples of the unloading arm manipulation training device according to one embodiment of the present invention.
Figure 5B:
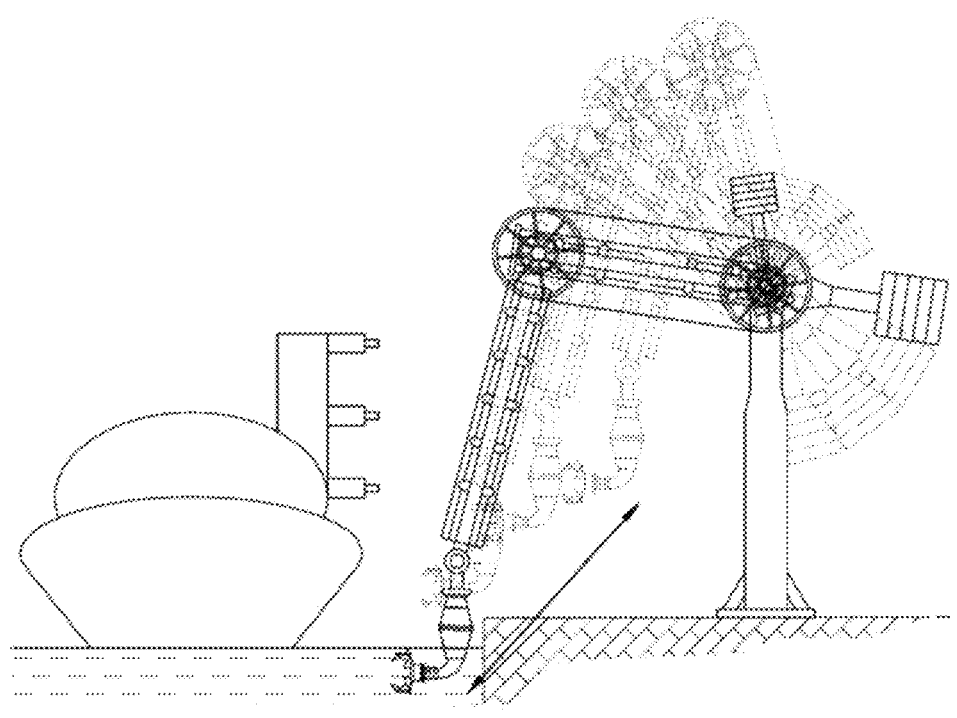

FIGS. 5A and 5B show usage examples of the unloading arm manipulation training device according to one embodiment of the present invention.

FIG. 5A shows a usage example of the unloading arm manipulation training device related to the outboard arm of the unloading arm. When the trainee manipulation unit 500 transmits a manipulation input of outboard arm unfolding or outboard arm folding to the control unit 800 by the trainee, the control unit 800 may update an unloading arm training video such that the outboard arm of the unloading arm is unfolded or folded. Generally, the manipulation input of the outboard arm unfolding may be updated to forward and upward movements of the unloading arm, and the manipulation input of the outboard arm folding may be updated to backward and downward movements of the unloading arm.

FIG. 5B shows a usage example of the unloading arm manipulation training device related to the inboard arm of the unloading arm. When the trainee manipulation unit 500 transmits a manipulation input of inboard arm ascending or inboard arm descending to the control unit 800 by the trainee, the control unit 800 may update an unloading arm training video such that the inboard arm of the unloading arm ascends or descends. Generally, the manipulation input of the inboard arm ascending may be updated to backward and upward movements of the unloading arm, and the manipulation input of the inboard arm descending may be updated to forward and downward movements of the unloading arm.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

The invention claimed is:

1. A device, which is an unloading arm manipulation training device, the device comprising:
a frame having a training space therein;

at least one screen which is provided on the frame and onto which an unloading arm training video is projected;

at least one image output unit which outputs the unloading arm training video onto the at least one screen;

a trainee manipulation unit to receive one or more manipulation inputs for unloading arm manipulation by the trainee; and a control unit to update the unloading arm training video output by the image output units according to the manipulation inputs, wherein the at least one image output unit is provided outside the frame and output the unloading arm training video onto outer surfaces of the at least one screen to prevent a trainee positioned inside the frame from being projected onto the at least one screen, wherein the trainee manipulation unit includes:

a movable manipulation unit used inside the frame by the trainee; and a fixed manipulation unit used outside the frame by the trainee, wherein only some of the manipulation inputs by the fixed manipulation unit are input to the movable manipulation unit.

2. The device of claim 1, wherein each of the at least one image output unit includes:

a projector which projects the unloading arm training video upward or downward; and a reflection unit which is provided above or below the projector and reflects the unloading arm training video projected by the projector onto the screen.

3. The device of claim 2, wherein the projector is provided as a plurality of projectors which project unloading arm training videos of different viewpoints to provide a three-dimensional video to the trainee wearing polarized glasses.

4. The device of claim 1, wherein each of the at least one screen is formed of a translucent material such that the unloading arm training video projected onto the outer surface of the screen is projected inside the frame.

5. The device of claim 1, wherein:

when the fixed manipulation unit transmits the manipulation inputs to the control unit, the control unit updates the unloading arm training video of which a viewpoint is fixed; and when the movable manipulation unit transmits the manipulation inputs to the control unit, the control unit updates the unloading arm training video of which a viewpoint is changed due to a position and a viewing angle of the trainee.

6. The device of claim 1, further comprising a detection sensor to detect a change in position of the trainee inside the frame, wherein the control unit updates the unloading arm training video on the basis of the change in position transmitted from the detection sensor to the control unit.

7. The device of claim 1, further comprising a manipulation unit for administrator which receives an administration input related to at least one of a plurality of pieces of emergency situation information including a change in surrounding environment, power loss, component failure, and line disconnection between quick release hooks (QRH) and a vessel by an administrator, wherein the control unit updates the unloading arm training video according to the administration input from the manipulation unit.

8. The device of claim 7, wherein at least some of the manipulation inputs by the trainee manipulation unit are restricted by the control unit according to the administration input.

* * * * *